US006290010B1

(12) United States Patent
Roudet et al.

(10) Patent No.: US 6,290,010 B1
(45) Date of Patent: Sep. 18, 2001

(54) POLE-GUIDED INDUSTRIAL TRUCK

(75) Inventors: Christopher Roudet, Naintre; Yves Briday, Jaunay Clan, both of (FR)

(73) Assignee: Linde Aktiengesellschaft (DE)

( * ) Notice: Subject to any disclaimer, the term of this patent is extended or adjusted under 35 U.S.C. 154(b) by 0 days.

(21) Appl. No.: 09/483,615

(22) Filed: Jan. 14, 2000

(30) Foreign Application Priority Data

Jan. 15, 1999 (DE) ........................................ 199 01 451

(51) Int. Cl.[7] ........................................ B62D 51/04
(52) U.S. Cl. ........................................ 180/19.2; 180/402
(58) Field of Search ........................................ 180/11, 12, 13, 180/19.1, 19.2, 19.3, 402

(56) References Cited

U.S. PATENT DOCUMENTS 5,097,917 * 3/1992 Serizawa et al. .................... 180/402
5,375,673 * 12/1994 McCall et al. .................... 180/13

OTHER PUBLICATIONS

Patent Abstracts of Japan, Publication No. 07206399 A, Aug. 8, 1995 entitled "Steering and Device for Ordered Picking Truck".

Article entitled "Ergonomische Gestaltung von Flurförderzeugen für Lagerbereiche", Dipl.–Ing. Friedrich Wilhelm Groll, Wagner Fördertechnik GmbH & Co KG Reutlingen (1995).

* cited by examiner

*Primary Examiner*—Kevin Hurley
(74) *Attorney, Agent, or Firm*—Webb Ziesenheim Logsdon Orkin & Hanson, P.C.

(57) ABSTRACT

A pole-guided industrial truck has at least one steered wheel and a pole that can rotate around an essentially vertical axis. The pole is effectively connected with the wheel so that a rotation of the pole around the vertical axis causes a steering movement of the wheel. The pole is connected with an electric primary detector which measures a rotational movement and/or a rotational position of the pole. The primary detector is effectively connected by means of an electric signal line with an electric steering motor of the wheel. The pole is connected with a damping element which generates a counter-torque when the pole is rotated around the vertical axis.

12 Claims, 2 Drawing Sheets

POLE-GUIDED INDUSTRIAL TRUCK

BACKGROUND OF THE INVENTION

1. Field of the Invention

This invention relates to a pole-guided industrial truck with at least one steered wheel and a pole rotatable around an essentially vertical axis. The pole is effectively connected with the wheel such that a rotation of the pole around the vertical axis effects a steering movement of the wheel. The invention also relates to a damping element for use in a steering device of an industrial truck of the type described above.

2. Description of the Prior Art

Industrial trucks of this type are frequently operated as accompanied vehicles whereby an operator walks along beside the industrial truck and steers the industrial truck by rotating the pole around the vertical axis, for which purpose the pole is equipped with a handle. In the vicinity of the handle, there can also be control elements by means of which, for example, the traction drive system of the industrial truck can be controlled.

On industrial trucks of the prior art, the pole has a mechanical connection with a steerable wheel of the industrial truck, which is frequently also the drive wheel of the industrial truck. In the prior art, for example, the wheel is sometimes coupled to the pole by means of a chain gear.

On these devices of the prior art, the actuation force of the pole to steer the industrial truck depends to a very great extent on the current operating conditions, in particular on the load status and the speed of travel of the industrial truck, as well as on the characteristics of the road or floor over which the industrial truck is traveling. When the industrial truck is stopped, the actuation force required to rotate the pole is relatively large. To give the operator a feel for the most appropriate steering movements of the wheel and to prevent any unintentional steering actions of the industrial truck, it is desirable if the actuation force required to rotate the pole, even at higher speeds of travel, does not drop below a specified threshold.

The object of this invention is therefore to make available an industrial truck with a pole on which the force required to steer the industrial truck corresponds to ergonomic requirements.

An additional object of the invention is to make available a damping element for use in the steering device, which is capable of generating a corresponding actuation force.

SUMMARY OF THE INVENTION

With regard to the industrial truck, the invention teaches that the pole is connected with an electrical primary detector which detects or measures a rotational movement and/or a rotational position of the pole, and the primary detector is effectively connected with an electric steering motor of the wheel by means of an electrical signal line. Therefore, there is no mechanical connection by means of which a steering movement of the pole is transmitted to the wheel being steered. The signal is transmitted exclusively electrically. The actuation force of the pole is therefore independent of the forces necessary to overcome the friction of the wheel on the road or floor. An additional advantage that results from the electrical signal transmission is that the position of the pole can be selected practically independently of the position of the steered wheel. No high-maintenance mechanical transmission means are necessary for the transmission of the steering movement, which mechanical means would also occupy a considerable amount of space.

It is further advantageous if the pole is connected with a damping element that generates a counter-torque when the pole is rotated around the vertical axis. The torque generated with the damping element guarantees that the operator can feel some resistance during the steering of the industrial truck. As a result of this sensible steering resistance, incorrect maneuvers that may result from the unintentional or uncontrolled rotation of the pole can be avoided.

The damping element is advantageously connected on one hand with a component that is non-rotationally connected with the pole, and is directly or indirectly connected on the other hand with a frame of the industrial truck. The torque required to rotate the pole is thereby supported on the frame.

It is also appropriate if a component that is non-rotationally connected with the pole is mounted on a frame of the industrial truck by means of roller bearings.

The primary detector is advantageously a potentiometer which measures the relative movement between a component that is non-rotationally connected with the pole and a frame of the vehicle. With this arrangement, the potentiometer generates an unambiguous signal that reflects the rotational position of the pole.

In one appropriate configuration, the component that is non-rotationally connected with the pole is provided in the form of an essentially vertically oriented shaft. The roller bearings, the damping element and the potentiometer can be located along the shaft, at some axial distance from one another.

The damping element can be connected with the shaft in a particularly simple manner if the damping element has an essentially ring-shaped configuration, whereby the vertically oriented shaft is coaxial with the damping element. The inside of the ring-shaped damping element preferably has a cross section that is suitable for the transmission of torques.

With regard to the damping element, to achieve the object described above, the invention teaches that the damping element has at least two components that are located coaxially and can be rotated with respect to each other, each of which has at least one cylindrical or conical friction surface, whereby a friction surface of the first component is in contact against a friction surface of the second component. When the two components are rotated, a sliding friction force is generated between the two friction surfaces that rub against each other. In the application described above for the pole of an industrial truck, this sliding friction force represents a torque that counteracts a steering movement of the pole.

Preferably, each of the two components that rotates with respect to each other has a plurality of friction surfaces. The two rotational components are thereby engaged with each other in the manner of a comb.

It is particularly advantageous if the two components that can be rotated with respect to each other are made out of plastic. The components can be manufactured by injection molding, for example. As a result of the elasticity of the plastic material, it is possible to avoid problems of the fit between the two components.

A lubricant is located in the cavities between the rotational components. It thereby becomes possible to avoid sudden changes in the level of the friction force at the transition between static friction and sliding friction.

It is appropriate if a silicone lubricant is provided as the lubricant. Silicone grease is characterized by a particularly long useful life, which means that it is unnecessary to replace the lubricant for the entire useful life of the damping element.

BRIEF DESCRIPTION OF THE DRAWINGS

Additional advantages and details of the invention are explained in greater detail below, with reference to the exemplary embodiment illustrated in the accompanying figures, in which.

DETAILED DESCRIPTION OF THE PREFERRED EMBODIMENT

Figure 1:
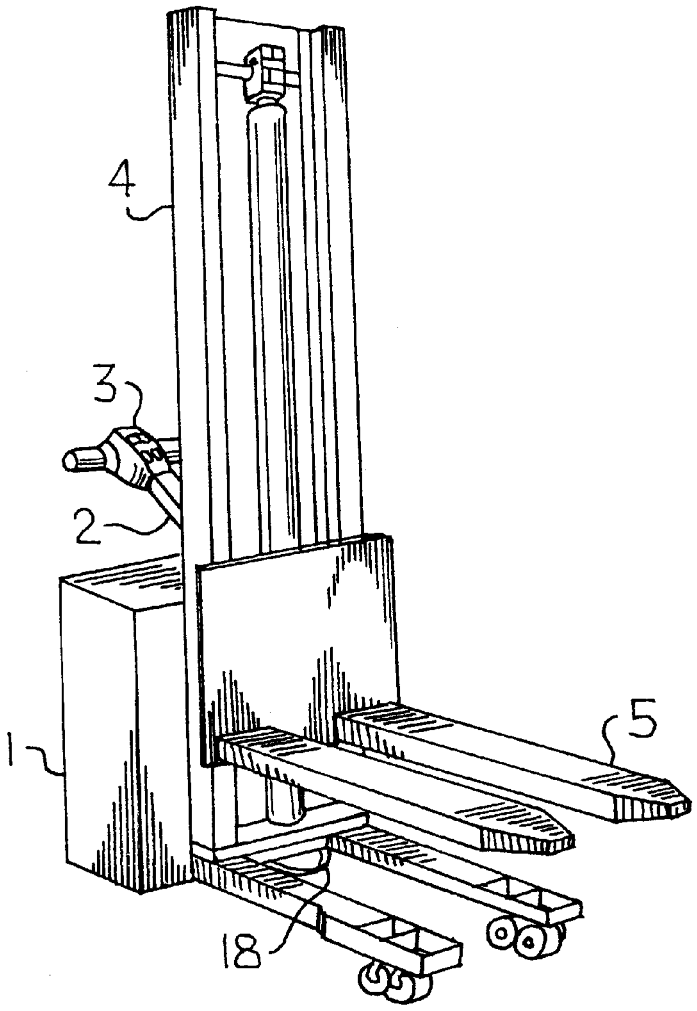
FIG. 1 shows a perspective view of a generic industrial truck.

FIG. 1 shows a pole-guided high-lift truck as one example of a pole-guided industrial truck. The industrial truck has a drive section 1 that cannot be raised, and that rests by means of wheels (not shown), as a rule one drive/steered wheel 18 and one pivoting roller, on the floor or ground. Connected to the drive section 1 is a lifting frame 4 on which a vertically moving load fork 5 is fastened.

Figure 2:
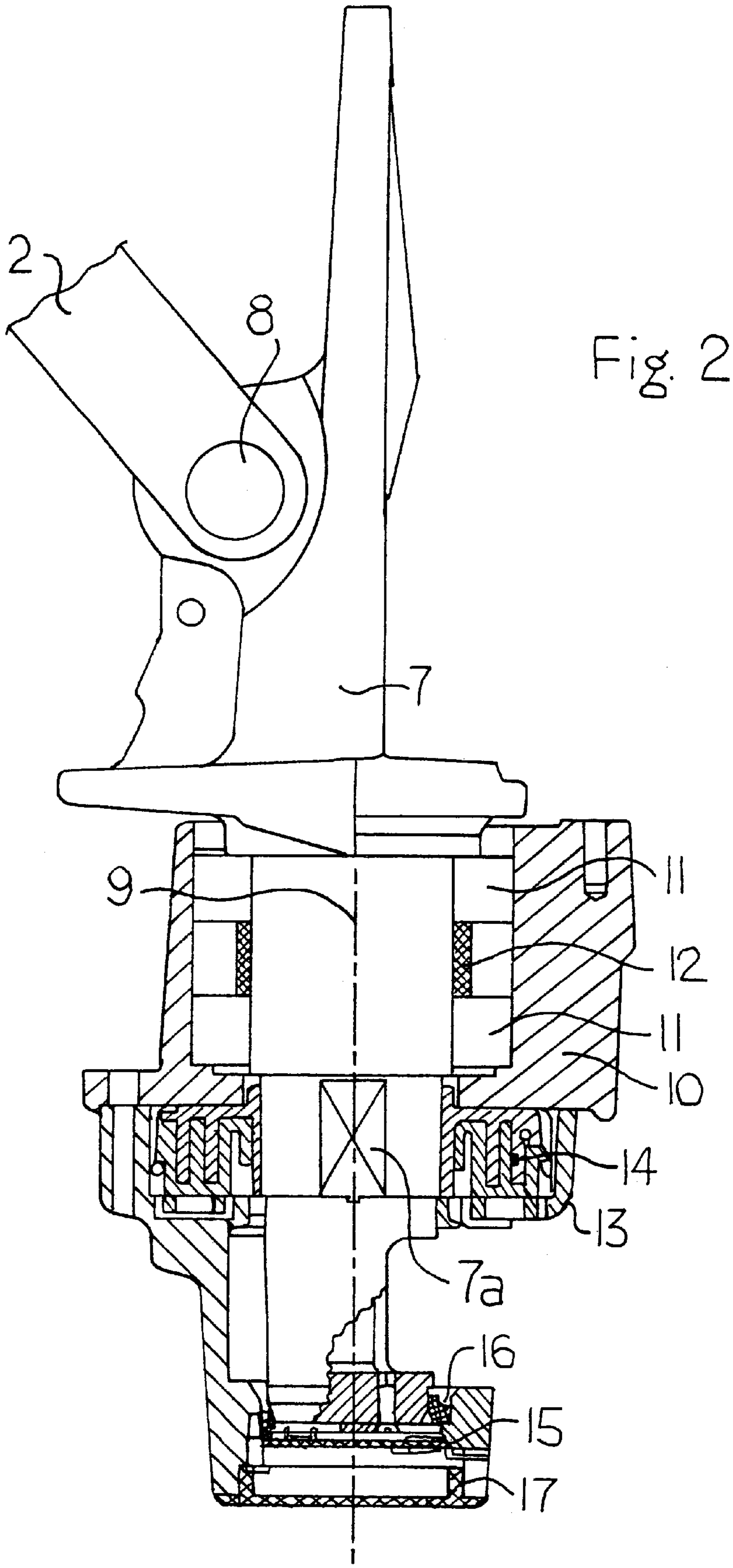
FIG. 2 shows a partial view of the mounting of a component that is non-rotationally connected with the pole.

FIG. 2 shows, first of all, a schematically drawn pole 2 with a component 7 mounted so that it can rotate around the vertical axis 9. In this case, the pole 2 can pivot around a horizontal axis 8 with respect to the component 7, whereby the rotational position of the pole 2 around this axis has no effect on the steering of the industrial truck. With regard to the vertical axis 9 that is relevant for the steering, the pole 2 is non-rotationally connected with the component 7.

The lower segment of the component 7 is equipped as a vertically oriented shaft which is rotationally mounted on a frame 10 of the drive section 1 of the industrial truck by means of roller bearings 11. The axial distance between the two roller bearings 11 is set by means of a spacer sleeve 12.

Figure 3:
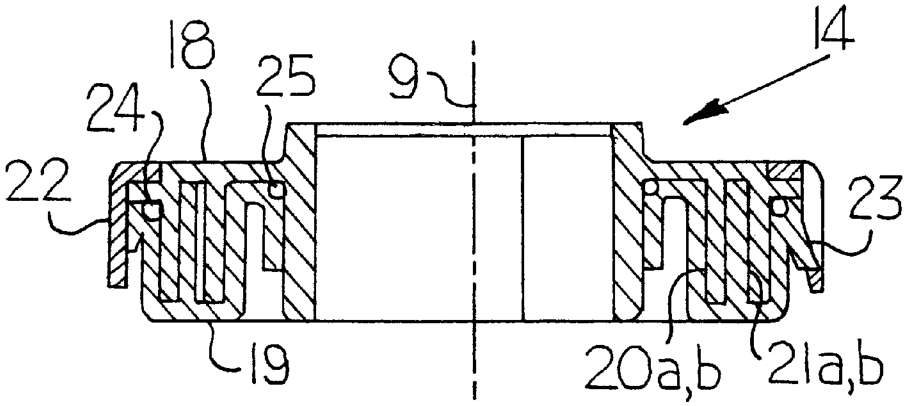
FIG. 3 shows a cross section of the damping element.

Rigidly connected with the frame 10 is a housing part 13, in which an outer ring of a damping element 14 is fixed (See FIG. 3). An inner ring of the damping element sits on the component 7, whereby a non-rotational form-fitting connection of the inner ring with the component 7 is ensured by a flattened portion 7*a*.

Fastened in the lower portion of the housing part 13 is a potentiometer 15, with which a rotational movement of the pole 2 and thus of the component 7 around the vertical axis 9 is measured. To protect the potentiometer 15 against external influences, the housing part 13 is sealed with respect to the component 7 by means of a rotary shaft seal 16. The lower end of the housing part 13 is closed with a sealing cap 17.

The operation of the steering device of the industrial truck is based on the fact that the potentiometer 15 generates an electrical signal that unambiguously reflects the rotational position or a rotational movement of the pole 2 around the vertical axis 9. This signal is evaluated in a suitable control device which actuates an electric steering motor so that the steered wheel of the industrial truck is steered as a function of the position of the pole 2. The signal transmission from the pole 2 to the steering motor is therefore exclusively electrical.

For the person operating the industrial truck, it is important that he or she be able to feel a resistance to the rotation of the pole 2 around the vertical axis 9. In other words, the pole 2 must not be excessively easy to rotate. The damping element 14 is provided so that a counter-torque is generated in the event of any rotational movement of the pole 2 around the vertical axis 9.

FIG. 3 illustrates the construction of the damping element 14 in greater detail. The damping element 14 has two ring-shaped components 18, 19 which are coaxial with each other and can be rotated with respect to each other. The component 18 thereby forms the inner ring of the damping element 14. The inner side of the component 19 which forms the inner ring has a flattened portion 26 which ensures a non-rotational connection of the component 19 with a shaft that is inserted in the inner ring, which shaft has a corresponding flat spot. The outer ring of the damping element 14 is formed by a coupling ring 22 which is positively connected with the component 19 by means of a snap connection 23, and the two coaxial components 18, 19 are fastened to each other in the axial direction.

The two components 18, 19 have essentially cylindrical friction surfaces 20*a*, 20*b*, 21*a*, 21*b* which are in contact with each other, and which slide against each other when the components 18, 19 are rotated. As a result of the elasticity of the components 18, 19, which are made of plastic, the friction surfaces 20*a*, 21*a* of the component 18 are pressed against the friction surfaces 20*b*, 21*b* of the component 19. Silicone grease is located in the cavities between the components 18, 19 to prevent any frictional wear of the components 18, 19 and of the coupling ring 22. The silicone grease simultaneously guarantees a constant torque during a rotation of the two components 18, 19. In particular, the silicone grease can prevent a sudden fluctuation in the friction during the transition from static friction to sliding friction. There are two O-rings 24, 25 to prevent any escape of the silicone grease from the damping element.

Having described presently preferred embodiments of the invention, it is to be understood that it may be otherwise embodied within the scope of the appended claims.

We claim:

1. A pole-guided industrial truck comprising:

at least one steered wheel;

a drive section operatively connected to the wheel;

a pole rotatable around a substantially vertical axis, with the pole connected with the wheel such that a rotation of the pole around the vertical axis effects a steering movement of the wheel;

a damping element connected to the pole, with the damping element generating a counter-torque when the pole is rotated around the vertical axis;

an electrical primary detector connected to the pole which detects at least one of a rotational movement and a rotational position of the pole, wherein the electrical primary detector is electrically connected to the drive section, wherein the damping element is connected to a shaft that is non-rotationally connected to the pole and is oriented substantially vertically, wherein the damping element has a substantially ring-shaped configuration and the shaft is coaxial with the damping element, and wherein the damping element includes two coaxial components each having at least one friction surface.

2. The pole-guided industrial truck as claimed in claim 1, wherein the damping element is further connected with a frame of the industrial truck.

3. The pole-guided industrial truck as claimed in claim 2, wherein shaft is mounted by roller bearings on the frame of the industrial truck.

4. The pole-guided industrial truck as claimed in claim 2, wherein the electrical primary detector is a potentiometer which is connected with the shaft and is further connected with the frame of the industrial truck.

5. The pole-guided industrial truck as claimed in claim 2, wherein the damping element is connected one of directly and indirectly with the frame of the industrial truck.

6. The pole-guided industrial truck as claimed in claim 3, wherein the electrical primary detector is a potentiometer which is connected with the shaft and is further connected with the frame of the industrial truck.

7. The pole-guided industrial truck as claimed in claim 1, wherein the friction surface of the first component is in contact with the friction surface of the second component.

8. The pole-guided industrial truck as claimed in claim 7, wherein each of the two components has a plurality of friction surfaces.

9. The pole-guided industrial truck as claimed in claim 7, wherein the two components are made of plastic.

10. The pole-guided industrial truck as claimed in claim 7, wherein a lubricant is located in cavities defined between the two components.

11. The pole-guided industrial truck as claimed in claim 10, wherein the lubricant is silicone grease.

12. The pole-guided industrial truck as claimed in claim 7, wherein the friction surface for each of the two coaxial components is one of a cylindrical and a conical friction surface.

* * * * *

UNITED STATES PATENT AND TRADEMARK OFFICE

CERTIFICATE OF CORRECTION

PATENT NO. : 6,290,010 B1
DATED : September 18, 2001
INVENTOR(S) : Christopher Roudet et al.

It is certified that error appears in the above-identified patent and that said Letters Patent is hereby corrected as shown below:

Column 3,
After line 20, insert the following paragraph:
-- Fastened to the drive section 1 is a pole 2 which can rotate around a vertical axis, whereby the steering movement of the drive wheel is controlled by rotating the pole 2. The pole 2 is fastened by means of a vertical shaft (See Fig. 2), which is mounted in a frame of the drive section 1. A pole head 3 located on the pole 2 has various control elements and handles. --.

Column 4,
Line 62, "wherein shaft" should read -- wherein the shaft --.

Signed and Sealed this

Eleventh Day of June, 2002

*Attest:*

JAMES E. ROGAN

*Attesting Officer*

*Director of the United States Patent and Trademark Office*